US005660402A

United States Patent [19]

Jones et al.

[11] Patent Number: 5,660,402

[45] Date of Patent: Aug. 26, 1997

[54] LAWN TARP

[76] Inventors: Eddie M. Jones; Deborah R. Jones, both of P.O. Box 893, Lakeland, Fla. 33802

[21] Appl. No.: 591,384

[22] Filed: Jan. 25, 1996

[51] Int. Cl.$^6$ .............................. B62B 15/00; B65F 1/14

[52] U.S. Cl. .............................................. 280/19; 294/1.1

[58] Field of Search ............................... 294/1.1, 74, 77, 294/141, 142, 151, 152, 156; 5/89.1, 625, 626; 56/329; 141/390, 391; 280/18, 19; 383/4, 6

[56] References Cited

U.S. PATENT DOCUMENTS 1,173,459 2/1916 Palmer ........................................ 5/89.1
2,974,971 3/1961 Buck .................................... 294/1.1 X
3,336,060 8/1967 Bradford ................................ 5/626 X
3,355,187 11/1967 Brindle ................................ 294/1.1 X
3,813,712 6/1974 Bonnin .................................... 5/625 X
4,173,351 11/1979 Hetland ............................... 294/1.1 X
4,561,480 12/1985 Underwood et al. ................ 294/1.1 X
5,104,133 4/1992 Reiner ....................................... 280/19

*Primary Examiner*—Johnny D. Cherry
*Attorney, Agent, or Firm*—American Innovations Inc.; Dorothy S. Morse, Attn.

[57] ABSTRACT

A tarp which may be pulled along the surface of the ground by hand, or while being attached behind a motorized vehicle, and used for expeditiously carrying a variety of objects which collectively would be too heavy or too awkward to carry in one's arms. The tarp has a hemmed perimeter, corner reinforcing pieces, at least one reinforced area attached to its bottom surface, a plurality of eyelets attached to the hemmed perimeter, and telescoping support bars positioned within the hemmed perimeter to evenly distribute pulling forces along the leading edge of the tarp. Applications may include, but are not limited to, use behind motorized vehicles such as tractors, lawn tractors, all terrain vehicles, snow mobiles, golf carts, truck, and automobiles, for residential, commercial, industrial, and agricultural purposes.

17 Claims, 2 Drawing Sheets

LAWN TARP

BACKGROUND—FIELD OF INVENTION

This invention relates to hauling tarpaulins and hauling sleds, specifically to a tarp which has a reinforced area attached to its bottom surface and telescoping support bars positioned within a hemmed perimeter and which may be pulled along the surface of the ground by hand, or while being attached behind a motorized vehicle, to carry a variety of objects which collectively would be too heavy or too awkward to carry in one's arms. Applications may include, but are not limited to, use behind motorized vehicles such as tractors, lawn tractors, all terrain vehicles, snow mobiles, golf carts, trucks, and automobiles, for residential, commercial, industrial, and agricultural purposes.

BACKGROUND—DESCRIPTION OF PRIOR ART

Tarpaulins are in common use for a variety of purposes. Many times they are used as a cover for objects or to provide shelter from the sun or inclement weather. They usually have a rectangular shape and are made from a variety of mildew and rot resistant materials, including polyethylene. The edges of such tarpaulins are usually hemmed and a rope is sometimes placed within the hem along the foldline of its perimeter for reinforcement. It is also known for such tarpaulins to have metal grommets secured through its material in each corner and along its sides. Such grommets usually have a central opening through which a small rope, or a bungee cord hook, may be inserted to allow such tarpaulins to be attached together or to other objects. The disadvantage of using such tarpaulins for hauling objects along the ground by hand or behind a motorized vehicle is that the material from which they are made is not reinforced and it deteriorates quickly during use as a result of repeated contact with rough and uneven ground surfaces. Also, when such tarpaulins are used for hauling objects along the ground by hand or behind a motorized vehicle, they are subject to tearing at or near the location of the grommets selected for attachment of a rope or a bungee cord hook.

Hauling sleds are also used behind motorized vehicles for carrying a variety of objects. Such sleds may have sides and a back portion to prevent objects from falling from the sled during use. The disadvantage of using such sleds is that they are rigid and have a defined carrying space, making them unsuitable for carrying large irregularly shaped objects, such as tree limbs. It is not known to have a tarp made of flexible material which may be dragged along the ground by hand, or behind a motorized vehicle, for use in carrying a variety of objects, including irregularly shaped objects, and which has a reinforced area attached to its bottom surface and telescoping support bars positioned within a hemmed perimeter to help evenly distribute pulling forces along the entire leading edge of the tarp.

SUMMARY OF INVENTION—OBJECTS AND ADVANTAGES

It is the primary object of this invention to provide a lawn tarp for hauling yard waste along the ground by hand or behind a motorized vehicle. It is also an object of this invention to provide a lawn tarp with a reinforced area attached to the underneath side of the lawn tarp to provide added strength to the lawn tarp for use in hauling objects along the ground by hand or behind a motorized vehicle and to prolong the useful life of the lawn tarp. A further object of this invention is to provide a lawn tarp with an adjustable means of distributing pulling forces along the leading edge of the lawn tarp to minimize tearing of the lawn tarp at or near specific attachment points. It is also an object of this invention to provide a lawn tarp having many places thereon for attachment of a rope or a bungee cord hook.

As described herein, properly manufactured, and used by hand or attached behind a motorized vehicle, the present invention would provide a tarp for hauling objects of varying sizes and shapes along the ground. The lawn tarp would provide a means for expeditiously moving objects that collectively would be too heavy or awkward for a person to carry in his or her arms. A reinforced area attached to the bottom surface of the tarp would help the tarp resist damage from repeated contact with the ground. Telescoping support bars positioned within the hem of the tarp would help to evenly distribute pulling forces along the entire leading edge of the tarp and prevent it from tearing at or near specific attachment points. The present invention would also provide corner reinforcing pieces and eyelets around its perimeter for attachment of the tarp to another tarp or other objects, or for rounding up the trailing edge of the tarp by attaching it near the tarp's midsection for containment of loose materials on the upper surface of the tarp while the tarp is moved along the surface of the ground by hand or behind a motorized vehicle. The telescoping feature of the support bars would make the present invention adapt for use behind different sizes of motorized vehicles. The telescoping support bars would have openings through which securing pins or bolts could be used to fix each telescoping support bar at a selected length. Telescoping support bars would also be removable from the hemmed perimeter. Also, all stitching used to hem the tarp material, and for securing the reinforced area to the bottom surface of the tarp, would be at least double stitching for additional strength and resistance to wear.

The description herein provides preferred embodiments of the present invention but should not be construed as limiting the scope of the lawn tarp invention. Variations in the type of tarp material used, the shape of the tarp material, the number of eyelets used around the perimeter of the tarp material, the size and shape of the reinforcing area attached to the bottom surface of the tarp material, the size and shape of the corner support pieces, the number of adjusting holes in the telescoping support bars positioned within the hemmed perimeter of the tarp material, and the type of pin or bolt used to fix the telescoping support bars at a selected length, other than those shown and described herein, can be incorporated into the present invention. Thus the scope of the present invention should be determined by the appended claims and their legal equivalents, rather than the examples given.

DETAILED DESCRIPTION OF PREFERRED EMBODIMENTS

Figure 1:
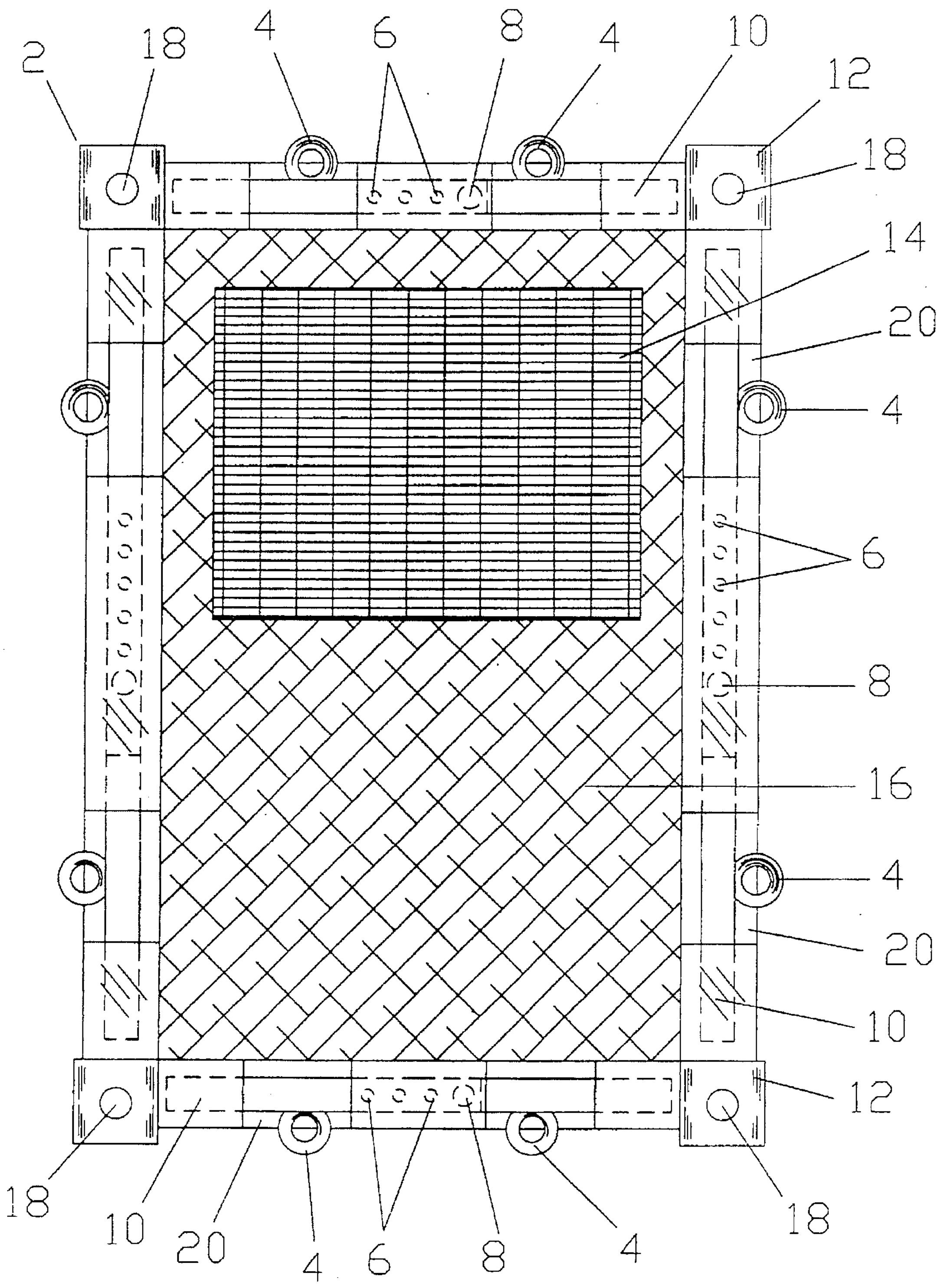
FIG. 1 is a bottom view of the invention having a reinforced area on its bottom surface and telescoping support bars within a hem around its perimeter.

FIG. 1 shows a preferred embodiment of a lawn tarp invention 2 having a substantially rectangular piece of tarp material 16 with a substantially rectangular reinforced area 14 located on the bottom surface of tarp material 16. It is contemplated for tarp material 16 and reinforced area 14 to be single-layered or multi-layered. The type of material from which tarp material 16 and reinforced area 14 are constructed is not critical to lawn tarp invention 2. It is contemplated for tarp material 16 and reinforced area 14 to be made out of the same type of material, or different materials. However, in the preferred embodiment it is contemplated for tarp material 16 and reinforced area 14 to be made from waterproof materials, such as vinyl. The perimeter of tarp material 16 is folded over and stitched to form a hemmed perimeter 22. In the preferred embodiment it is contemplated that the stitching (not shown) used to secure hemmed perimeter 22 be at least double stitched. Also, in the preferred embodiment it is contemplated for reinforced area 14 to be stitched to tarp material 16, although stitching of reinforced area 14 to tarp material 16 is not critical to lawn tarp invention 2. It is contemplated for attachment of reinforced area 14 to tarp material 16 to be made in any manner which would assure firm and long lasting attachment. FIG. 1 also shows a corner reinforcing piece 12 attached to each of the four corners of tarp material 16, centralized openings 18 in each corner reinforcing piece 12, eyelets 4 attached to tarp material 16 around its perimeter, four telescoping support bars 10 positioned within hemmed perimeter 22, and cut-out portions 20 in hemmed perimeter 22 through which eyelets 4 and telescoping support bars 10 are exposed. Corner reinforcing pieces 12 may be made from the same material used to construct tarp material 16 and reinforcing area 14, or from different materials. Also in the preferred embodiment, it is contemplated for centralized openings 18 and eyelets 4 to have an inside diameter large enough for insertion therethrough of a rope (not shown) or a bungee cord hook (not shown). In the preferred embodiment it is contemplated for telescoping support bars 10 to be removable from hemmed perimeter 22. FIG. 1 shows each telescoping support bar 10 having a pair of components, one of the pair of components being larger and having an inner diameter slightly larger than the outer diameter of its smaller paired component so that the smaller component may move axially into and out of the larger component. It is also contemplated for the present invention to have telescoping support bars 10 with more than two components. Each component of telescoping support bars 10 also has several apertures 6 therethrough through which locking devices 8 may be inserted for fixing each component of telescoping support bars 10 at a selected length relative to an adjacent component. In the preferred embodiment it is contemplated for locking devices 8 to comprise bolts or securing pins.

Figure 2:
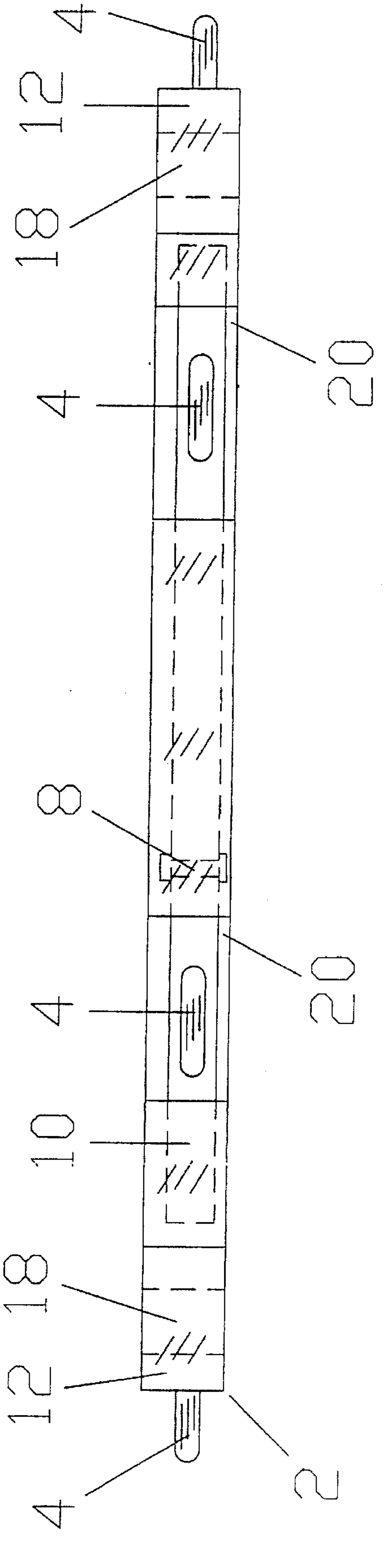
FIG. 2 is a side view of the invention.

FIG. 2 shows eyelets 4 attached to hemmed perimeter 22 and telescoping support bar 10 positioned within hemmed perimeter 22. In the preferred embodiment, eyelets 4 may be made of plastic or a non-rusting metal. Although not shown, it is contemplated for all stitching on the present invention to be comprised of double or triple stitching. Although both tarp material 16 and reinforced area 14 are shown to have a substantially rectangular shape, the rectangular shape is not critical to the present invention. It is contemplated for tarp material 16 and reinforced area 14 to have other configurations, such as a trapezoid. It is also contemplated for lawn tarp invention 2 to be manufactured in different sizes for use behind different sizes of tractors.

What is claimed is:

1. A lawn tarp for use in pulling a variety of objects along the surface of the ground by hand and also while being attached behind a motorized vehicle, said lawn tarp comprising a quantity of flexible material having a bottom surface, a plurality of corners, and a plurality of edges, each of said edges being folded and stitched to form a hemmed perimeter; a quantity of thread for stitching said hemmed perimeter; at least one quantity of reinforcing material attached to said bottom surface; a plurality of corner reinforcing pieces, at least one of said corner reinforcing pieces being attached to each of said corners; a plurality of eyelets attached to said hemmed perimeter, each of said eyelets having a hole therethrough of adequate size for insertion of a rope or a bungee cord hook; and a plurality of support bars positioned within said hemmed perimeter to help evenly distribute pulling forces along said hemmed perimeter, said support bars being adjustable in length.

2. The lawn tarp of claim 1 wherein said quantity of flexible material is waterproof.

3. The lawn tarp of claim 1 wherein said support bars are removable from said hemmed perimeter.

4. The lawn tarp of claim 1 wherein said hemmed perimeter is stitched at least twice for reinforcement.

5. The lawn tarp of claim 1 wherein each of said quantities of reinforcing material is stitched to said quantity of flexible material.

6. The lawn tarp of claim 1 wherein each of said support bars comprise at least two components, each of said components within the same support bar being connected to an adjacent component in a telescoping manner so that each of said support bars is adjustable in length between a collapsed position and an extended position, and said lawn tarp further comprising locking means to fix each of said support bars into said collapsed position, into said extended position, and into other positions therebetween.

7. The lawn tarp of claim 6 wherein said locking means comprises a plurality of apertures through each of said components and a plurality of bolts for insertion through at least one of said apertures on each of said components to fix each of said components in the same support bar into a selected length between said collapsed position and said extended position.

8. The lawn tarp of claim 6 wherein said locking means comprises a plurality of apertures through each of said components and a plurality of securing pins for insertion through at least one of said apertures on each of said components to fix each of said components in the same support bar into a selected length between said collapsed position and said extended position.

9. A lawn tarp for use in pulling a variety of objects along the surface of the ground by hand and also while being attached behind a motorized vehicle, said lawn tarp comprising a quantity of flexible material having a bottom surface, a plurality of corners, and a plurality of edges, said flexible material being waterproof, said edges being folded and stitched to form a hemmed perimeter; a quantity of thread for stitching said hemmed perimeter; at least one quantity of reinforcing material attached to said bottom surface; a plurality of corner reinforcing pieces, at least one of said corner reinforcing pieces being attached to each of said corners; a plurality of eyelets attached to said hemmed perimeter, each of said eyelets having a hole of adequate size for insertion therethrough of a rope or a bungee cord hook; a plurality of support bars positioned within said hemmed perimeter to help evenly distribute pulling forces along said hemmed perimeter, each of said support bars comprising at least two elongated components, each of said components within the same support bar being connected to an adjacent one of said components in a telescoping manner so that each of said support bars is adjustable in length between a collapsed position and an extended position; and said lawn tarp further comprising a locking means to fix each of said support bars into said collapsed position, into said extended position, and into other positions therebetween.

10. The lawn tarp of claim 9 wherein said support bars are removable from said hemmed perimeter.

11. The lawn tarp of claim 9 wherein said hemmed perimeter is stitched at least twice for reinforcement.

12. The lawn tarp of claim 9 wherein each of said quantities of reinforcing material is stitched to said quantity of flexible material.

13. The lawn tarp of claim 9 wherein said locking means comprises a plurality of apertures through each of said components and a plurality of bolts for insertion through at least one of said apertures on each of said components to fix each of said components in the same support bar into a selected length between said collapsed position and said extended position.

14. The lawn tarp of claim 9 wherein said locking means comprises a plurality of apertures through each of said components and a plurality of securing pins for insertion through at least one of said apertures on each of said components to fix each of said components in the same support bar into a selected position between said collapsed position and said extended position.

15. A lawn tarp for use in pulling a variety of objects along the surface of the ground by hand and also while being attached behind a motorized vehicle, said lawn tarp comprising a quantity of flexible material having a bottom surface, a plurality of corners, and a plurality of edges, said flexible material being waterproof, said edges being folded and stitched to form a hemmed perimeter, said hemmed perimeter being stitched at least twice for reinforcement; at least one quantity of reinforcing material stitched to said bottom surface, each of said quantities of reinforcing material being stitched at least twice to said bottom surface for reinforcement; a quantity of thread for stitching said hemmed perimeter and each of said quantities of reinforcing material; a plurality of corner reinforcing pieces, at least one of said corner reinforcing pieces being attached to each of said corners, each of said corner pieces having at least one centralized opening therethrough; a plurality of eyelets attached to said hemmed perimeter, each of said eyelets having a hole of adequate size for insertion therethrough of a rope or a bungee cord hook; a plurality of support bars positioned within said hemmed perimeter to help evenly distribute pulling forces along said hemmed perimeter, said support bars being removable from said hemmed perimeter, each of said support bars comprising at least two elongated components, each of said components within the same support bar being connected to an adjacent one of said components in a telescoping manner so that each of said support bars is adjustable in length between a collapsed position and an extended position; and said lawn tarp further comprising a locking means to fix each of said support bars into said collapsed position, into said extended position, and into other positions therebetween.

16. The lawn tarp of claim 15 wherein said locking means comprises a plurality of apertures through each of said components and a plurality of bolts for insertion through at least one of said apertures on each of said components to fix each of said components in the same support bar into a selected length between said collapsed position and said extended position.

17. The lawn tarp of claim 15 wherein said locking means comprises a plurality of apertures through each of said components and a plurality of securing pins for insertion through at least one of said apertures on each of said components to fix each of said components in the same support bar into a selected position between said collapsed position and said extended position.

* * * * *